Patented Mar. 22, 1927.

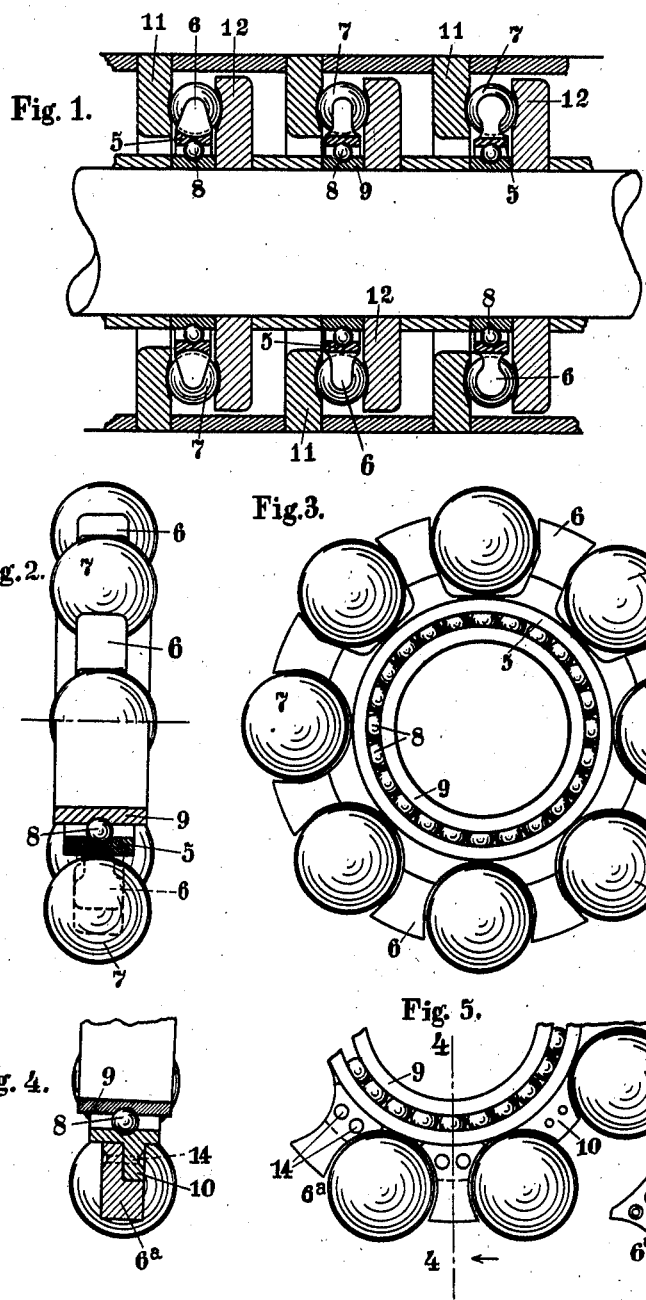

1,622,065

UNITED STATES PATENT OFFICE.

FRANZ SYMANZIK, OF SCHWEINFURT, GERMANY.

THRUST BALL BEARING.

Application filed July 1, 1920, Serial No. 393,475, and in Germany December 10, 1917.

This invention relates to a combination of a number of ball-bearings adapted to receive end-thrust, with means for spacing the balls, but also permitting them a certain mobility for the purposes hereinafter disclosed.

The object of the invention is to devise a multiple system of thrust ball-bearings in which the load to be supported is distributed to the rows of balls, thus avoiding overloading of the single balls and at the same time maintaining same in a proper operative position. It may here be stated that in ballbearing combinations of this kind it is generally difficult to get a uniform distribution of the load, owing to the inavoidable inaccuracies in mounting the various parts of such combinations, and that from this fact there results the undue pressure on some of the series, while other rows are running free, back-lash of the pertinent parts preventing the normal contact of the balls with the ball races.

The object of the invention is attained by availing of the centrifugal force acting upon the balls, for producing a self-adjustment of the balls which are thereby held in the required position in which they are capable of receiving and transmitting part of the endthrust of the shaft. For this purpose the balls are given a considerable mobility or play in the radial direction, so that the balls not loaded will during operation of the bearing-system be pressed upon the slope of the outer shoulders confining the balls-races in the bearing-discs or plates. From this pressure and the action of the balls like a wedge on the sloping sides of the races an axial component results which acts oppositely to the end-thrust of the shaft.

To attain this object, it is further essential so to guide the balls of each row that said balls are spaced apart in such a manner that they are able to adjust themselves radially, but prevented from assembling and accumulating upon one side of the axis, which would cause an unequal support and even diagonal position of the bearing discs. A spacing ring concentrically supported in the bearing and having radial ball-spacing projections will be fit to correspond to the requirements herebefore exposed.

Other objects of the invention will be disclosed in the following description and 55 claims.

In the accompanying drawings, which form a part of this specification, an embodiment of the new ball-bearing combination is represented as example.

In the drawing—

Figure 1 is a diagrammatic illustration of the said ball-bearing, showing an axial sectional elevation;

Figure 2 represents an end elevation showing partly the outer periphery and partly a cross-section of a spacer-ring used in the bearing shown in Figure 1;

Figure 3 is a side elevation of the spacer-ring;

Figure 4 is a partial cross-section and Figure 5 is a partial front view of a modification of the spacer-ring.

Like numerals designate like parts throughout all figures of the drawings.

In the multiple thrust ball-bearing represented in Figure 1, the total load is distributed upon three series of balls 7 capable of receiving end-thrust in the same direction. The race-discs 11 and 12 of said ball-rows 7 are respectively mounted in a bearing box, and on the common shaft and fixed thereto by suitable known means, to secure them against displacement. The balls in every series are maintained apart by a spacer ring 5 having radial lugs or projections 6 located between adjacent balls, a free radial displacement being permitted to the balls between each pair of lugs (see Fig. 3), and to that end the radius of curvature of the ball race-grooves of the bearing discs, which are shown diagrammatically in Fig. 1, is a little larger than the radius of the balls.

From this arrangement of the parts various advantages arise for the exact and smooth operation of the bearing. The balls 7 being radially adjustable, will be pressed on the grooves of the discs 11 and 12, respectively, under all conditions by centrifugal force. The action with respect to those rows of balls which at that time are not or are only partly under pressure is such, that the balls are forced against the outer shoulders of the race-grooves formed in the discs 11 and 12, and will produce a reaction contrary to the end-thrust. From this self-adjustment of the balls the distribution of the total load to all of the rows of balls is obtained, so that the danger of overloading of a single row is removed.

The spacer-ring represented in detail by 110

Figures 2 and 3, comprises an annular body 5 and lugs 6 projecting from its circumference in the required number to space apart each ball 7 from the adjacent ones and to guide them in equidistant places around the body 5 and in the race-grooves of the discs 11 and 12. The lugs 6 can be made in any suitable way, for instance, by forming recesses in a full ring, as well as the cross-section given to the lugs, which may vary according to the requirements, as illustrated in connection with three rows of balls in Figure 1. The ball-receiving depressions of the spacer-ring may also have different shapes, as shown in Figure 3; provision only being made for a precise radial guiding of the balls by the outer parts of the adjacent faces of the lugs.

It is essential for the correct operation of the bearing, to maintain the spacer-ring concentrically with the discs. Preferably and conveniently such guiding is obtained with the use of a radially operative small ball-series 8 received in well known race-grooves formed in the opposite peripheries of the ring-body 5 and of a race-ring 9 located upon the common shaft. The described exact centering will secure the spacer-ring against eccentric displacement and avoid troubling of the balls, as would be the case, when the spacer-ring bears on same and impedes part of them from radial adjustment.

In order to maintain the precise dimensions of all elements of the ball-bearing at all temperatures it is necessary to make the spacer-ring of the same material as all other parts; on the other hand the guiding of the balls in radial direction will be improved by their contact with antifriction-metal. These different requirements are complied with, when manufacturing the ring-body 5 from steel, while the lugs 6ª are made from a copper alloy, such as brass, bronze and the like, and fixed to outer projections 10 of the ring-body by rivets 11 or similar connecting means. Figures 4 and 5 represent the aforesaid construction of the spacer. Of course, any other known connections may be used for the same purpose, such as dove-tail, or soldering, bracing and the like. In the latter case the spacer-ring will resemble the modifications shown in Figures 1 and 3.

The arrangement hereinbefore described in connection with a multiple bearing for end-thrust in one direction is also applicable with bearings adapted to receive alternating axial pressures.

Several embodiments of the invention have been described in the foregoing specification and represented in the drawings, but evidently the principle of the invention may be performed in various ways.

What I claim as my invention, and desire to secure by Letters Patent, is—

1. In a thrust bearing, a spacer-ring provided with ball spacing lugs projecting from its periphery and adapted to permit radial movement of the balls, said lugs consisting of anti-friction metal secured to the periphery of the ring.

2. In a thrust bearing, a spacer-ring provided on its periphery with a series of radially extending spaced projections and radially projecting ball-spacing lugs secured to said projections; said lugs consisting of anti-friction metal and adapted to permit radial movement of the balls therebetween.

3. A thrust ball bearing comprising a plurality of series of balls, each series being arranged between bearing discs having ball-race grooves in their confronting surfaces, a spacer-ring for each series of balls having peripherally spaced projections and radially projecting ball-spacing lugs secured on said projections; said lugs being formed of anti-friction metal and adapted to permit radial movement of the balls therebetween, and means for supporting the spacer-rings concentric with said bearing discs.

4. A thrust bearing comprising a plurality of series of balls, concentrically supported spacer-rings having radial ball-spacing projections thereon provided with attached terminal portions or lugs and adapted to permit a limited radial movement of the balls confined therebetween, each series of balls being arranged between relatively fixed plates or disks having ball-race grooves in their confronting surfaces constructed to permit a limited radial movement of the balls, and ball-bearings concentrically supporting said spacer-rings, said lugs consisting of anti-friction metal.

In testimony whereof I have signed my name to this specification.

FRANZ SYMANZIK.